United States Patent
Chmaytelli et al.

(10) Patent No.: US 6,542,729 B1
(45) Date of Patent: Apr. 1, 2003

(54) SYSTEM AND METHOD FOR MINIMIZING FRAUDULENT USAGE OF A MOBILE TELEPHONE

(75) Inventors: Mazen Chmaytelli, San Diego, CA (US); Samir K. Khazaka, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/300,799

(22) Filed: Apr. 27, 1999

(51) Int. Cl.⁷ .............................................. H04M 1/66
(52) U.S. Cl. .................. 455/410; 455/405; 379/127.02; 379/114.14
(58) Field of Search ................................ 455/410, 411, 455/422, 412, 414, 415, 424, 406, 408, 405; 379/59, 114.01, 114.04, 114.05, 114.14, 121.01, 127.02

(56) References Cited

U.S. PATENT DOCUMENTS

| | | | | |
|---|---|---|---|---|
| 5,220,593 A | * | 6/1993 | Zicker et al. | 379/59 |
| 5,345,595 A | * | 9/1994 | Johnson et al. | 455/410 |
| 5,555,551 A | * | 9/1996 | Rudokas et al. | 379/59 |
| 5,615,408 A | * | 3/1997 | Johnson et al. | 455/405 |
| 5,752,189 A | * | 5/1998 | Ueno et al. | 455/410 |
| 5,812,650 A | * | 9/1998 | Gammino | 379/189 |
| 5,835,857 A | * | 11/1998 | Otten | 455/410 |
| 5,839,063 A | * | 11/1998 | Lee | 455/410 |
| 5,875,236 A | * | 2/1999 | Jankowitz et al. | 379/114 |
| 5,907,602 A | * | 5/1999 | Peel et al. | 379/114 |
| 5,907,803 A | * | 5/1999 | Nguyen | 455/410 |
| 5,978,670 A | * | 11/1999 | Casoli et al. | 455/411 |
| 6,047,174 A | * | 4/2000 | Frederick | 455/410 |
| 6,163,604 A | * | 12/2000 | Baulier et al. | 379/189 |
| 6,167,252 A | * | 12/2000 | Cohen | 455/410 |
| 6,181,925 B1 | * | 1/2001 | Kaminsky et al. | 455/410 |
| 6,185,416 B1 | * | 2/2001 | Rudokas et al. | 455/410 |
| 6,195,568 B1 | * | 2/2001 | Irvin | 455/563 |

* cited by examiner

Primary Examiner—Edward F. Urban
Assistant Examiner—Charles Craver
(74) Attorney, Agent, or Firm—Philip R. Wadsworth; Charles D. Brown; Howard H. Seo

(57) ABSTRACT

A system and method for minimizing fraudulent usage of a mobile telephone, wherein data regarding an authorized user's prior usage of a mobile telephone is accumulated, data regarding a current user's usage of the mobile telephone is accumulated, the statistical variation in usage between the authorized user's prior usage and the current user's usage is analyzed, and the mobile telephone is deactivated if the variation in usage exceeds a predetermined threshold.

18 Claims, 4 Drawing Sheets

US 6,542,729 B1

SYSTEM AND METHOD FOR MINIMIZING FRAUDULENT USAGE OF A MOBILE TELEPHONE

BACKGROUND OF THE INVENTION

I. Field of the Invention

The present invention relates generally to mobile telephones and more particularly to minimizing fraudulent usage of mobile telephones. Still more particularly, the present invention relates to the use of statistical methods for minimizing the fraudulent use of mobile telephones.

II. Description of the Prior Art

Fraudulent usage of stolen mobile telephones is a major problem in the mobile telephone industry, both from the perspective of a carrier and from that of a consumer. Thieves of unprotected mobile telephones are able to use the mobile telephones to place and receive numerous calls, particularly lengthy long distance and international calls. The thieves also may sell the stolen and not yet deactivated mobile telephones to others to allow them to make such calls, with little fear of the calls ever being traced to them.

The carrier is exposed to the risk of being unable to collect any compensation for the use of its system, increasing its overhead with respect to all legal calls. Moreover, the carrier may be responsible for cash payments to third parties with respect to such calls, especially where such calls are long distance or international. The result is reduced profits or higher rates for all legitimate consumers, or, typically, both.

From the consumer's point of view, not only does fraudulent use of mobile telephones lead to higher rates for legitimate users, but such criminal use exposes the consumer to more personal risks as well. First is the risk that the mobile telephone will be stolen, not primarily for its intrinsic value, but for the value of being able to make unlimited calls without payment for a limited period of time. The second risk is that the consumer will be charged for the fraudulent calls. Although reporting the theft of a mobile telephone promptly will tend to decrease the amount of fraudulent use of a stolen telephone, it will not eliminate it entirely. And if the consumer does not initially realize that the telephone has been stolen or the carrier fails to act sufficiently swiftly, significant charges may be incurred. Even if the charges are ultimately absorbed by the carrier, the consumer must often expend considerable time and effort before the carrier determines not to bill the consumer for the fraudulent calls.

It is therefore an object of the present invention to minimize the losses suffered by a carrier due to fraudulent use of a stolen mobile telephone by detecting such fraudulent use automatically.

It is a further object of the present invention to deter the theft of mobile telephones and their fraudulent use by providing an effective means of preventing significant fraudulent use of stolen mobile telephones.

SUMMARY OF THE INVENTION

The present invention is directed to a system and method for minimizing fraudulent usage of a mobile telephone. The system accumulates data regarding an authorized user's prior usage of a mobile telephone. The system also accumulates data regarding a current user's usage of the mobile. The system then analyzes the statistical variation in usage between the authorized user's prior usage and the current user's usage. The mobile telephone is deactivated if the variation in usage exceeds a predetermined threshold.

BRIEF DESCRIPTION OF THE DRAWINGS

The features, objects, and advantages of the present invention will become more apparent from the detailed description set forth below when taken in conjunction with the drawings in which like reference characters identify corresponding elements and wherein.

DETAILED DESCRIPTION OF THE PREFERRED EMBODIMENTS

Figure 1:
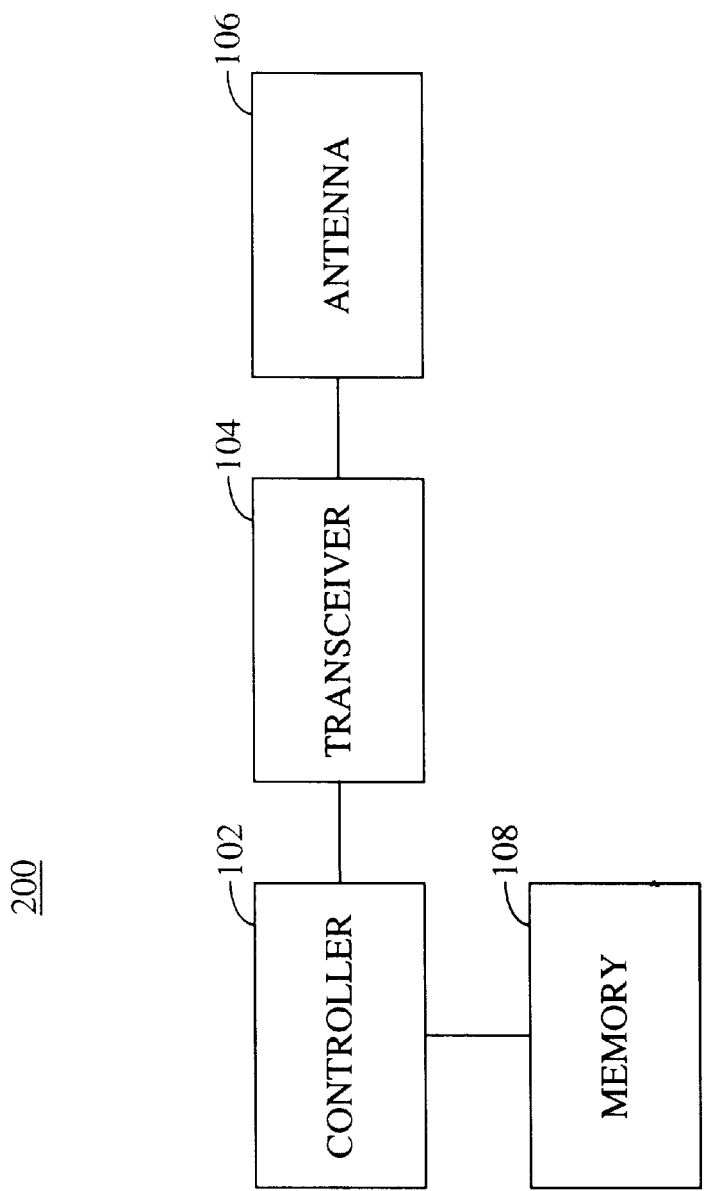
FIG. 1 is a block diagram in accordance with a preferred embodiment of the present invention.

The following definitions are provided to aid in understanding the present application:

Authorized user. The user of a mobile telephone whose use thereof is assumed to have been authorized. In particular, it is assumed that the authorized user is the legal owner of the mobile telephone and that he has entered into a contract with a carrier for the provision of service, or that the authorized user is a person legally authorized by such owner to use the mobile telephone. Data regarding the authorized user's prior usage of the mobile telephone will have been stored, preferably in the mobile telephone.

Carrier. The carrier is the primary provider of telephone service with respect to the mobile telephone.

Current user. The person or persons whose use of the mobile telephone during a continuous period of time extending from a point in the past to the present time has not yet been determined to be authorized.

Deactivation. A state in which a user may not initiate or receive any calls from the mobile telephone, with the exceptions that he may initiate calls to an operator of the carrier for the purpose of reactivating (and possibly unlocking) the mobile telephone and to emergency service numbers (such as 911).

First time call. A call placed to or received from a number that has never before been called from the mobile telephone and from which no call has ever before been placed to the mobile telephone.

Frequent usage call. A frequent usage call is a call placed to or received from a number with regard to which a substantial amount of telephone traffic involving the authorized user has occurred in the past. In different embodiments of the present invention "substantial" can mean more than a predetermined percentage of all calls placed or received by the authorized user from the mobile telephone, more than a predetermined proportion of the total length of all telephone traffic involving such number and the authorized user divided by the total length of all telephone traffic involving the authorized user, one of a predetermined number of telephone numbers from which or to which the most calls have been placed, or one of a predetermined number of telephone numbers from which or to which the total length of telephone traffic has been the greatest.

Frequent usage geographic region. A frequent usage geographic region is a region the authorized user has frequently entered in the past. In different embodiments of the present invention, frequent usage geographic region can refer to one of a predetermined number of regions entered most frequently by the authorized user in the past or a region possessing the property that the ratio of the number of times that the authorized user has in the past entered that region divided by the total number of entrances of the authorized user into all regions in the past exceeds a predetermined ratio.

Geographic region. A geographic region is a geographic area determined by the carrier that constitutes a single zone for billing purposes with respect to some of its customers, whether or not the rates paid by or for the authorized user depend on the zone from which or to which calls are placed.

Locked. A state in which a user may not initiate or receive any calls from the mobile telephone, with the exceptions that he may initiate calls to an operator of the carrier for the purpose of reactivating (and possibly unlocking) the mobile telephone and to emergency service numbers (such as 911). Furthermore, the user may not reactivate the mobile telephone from this state by entering a password.

Long distance call. A long distance call is any call that is not considered by the carrier to be a local call whether or not an interstate call, and includes regional toll calls. A call may be considered a long distance call even if a higher rate does not attach to making such a call (as may be the case under certain single rate calling plans).

Normal. A state in which a mobile telephone is neither deactivated nor locked.

Prior usage. Prior telephone traffic involving an authorized user.

Reactivation. Returning from a deactivated or locked state to a normal state.

Standard identification data. Data that is used to verify the identity of a person. Standard identification data includes a person's name, addresses, e-mail address, telephone numbers, social security number, and mother's maiden name.

Telephone traffic. Telephone traffic consists of calls placed from the mobile telephone and calls placed to the mobile telephone. With regard to a particular telephone number, telephone traffic refers to all calls placed from the mobile telephone to that number as well as all calls received at the mobile telephone from that telephone number.

Unfamiliar geographic region. A region that the authorized user did not previously enter.

Referring to FIG. 1, mobile telephone 100 includes controller 102, on which is stored the fraud reduction software described below. Controller 102 is connected to a memory 108 in which usage and other data is stored, as is also described below. Controller 102 is also connected to transceiver 104, which in turn is connected to antenna 106.

Figure 2A:
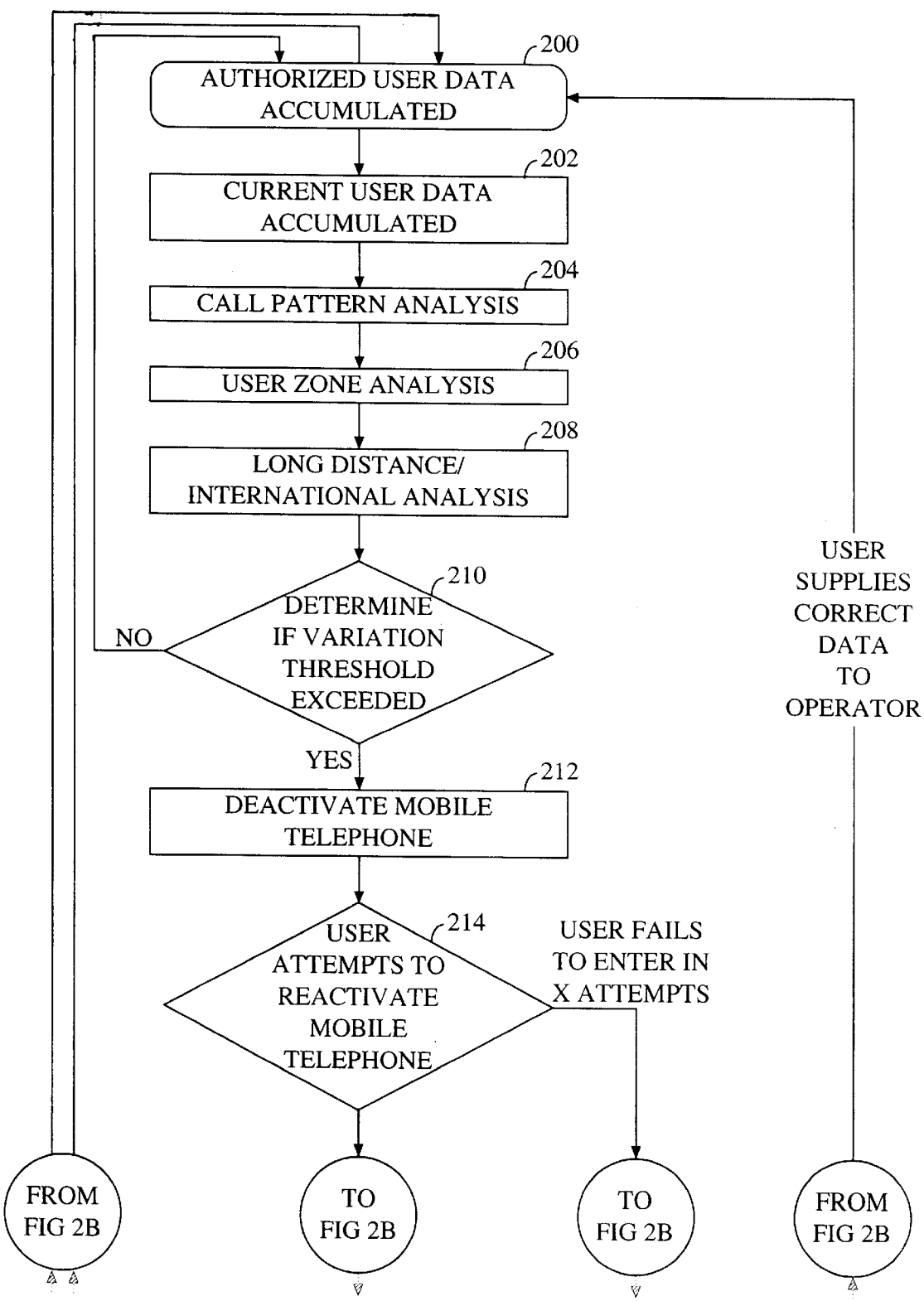
FIG. 2 is a flow diagram showing the operation of a preferred embodiment of the present invention.
Figure 2B:
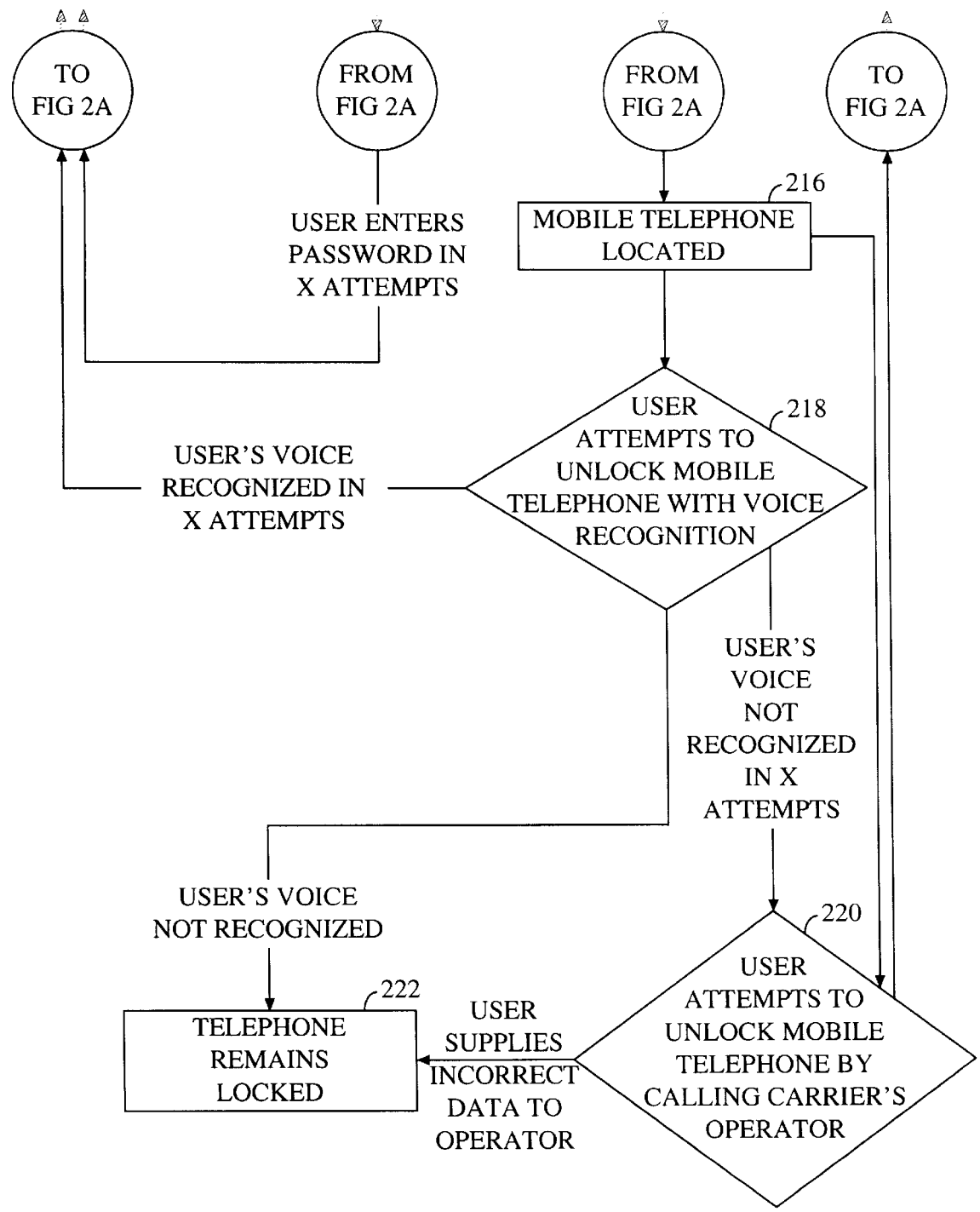

Referring to FIG. 2, usage data relating to the authorized user is first collected in step 200. This data may be collected by using a series of prompts shown on a display on mobile telephone 100 to induce the authorized user to enter data relating to his calling patterns prior to initial use of the mobile telephone. Such data could include the telephone numbers he would be most likely to call or from which he would be most likely to receive calls, the area codes to which the authorized user would be most likely to place calls and from which he would be most likely to receive calls, whether the authorized caller thought it was likely that he would place or receive any international calls, and, if so, the countries he would be likely to call or from which he would likely receive calls, and the geographical regions he would be most likely to enter. In addition, such data could include the times of day he would be most likely to use the mobile telephone and the length of a typical call that he would be likely to make.

Alternatively, the data relating to the authorized user could initially be gathered by automatic logging of data relating to the authorized user's calls and location into memory 108. In this case, the present invention would not be operative to reduce fraudulent use of the mobile telephone until a critical amount of data had been gathered. Once this data had been gathered, an icon could be displayed on a display on the mobile telephone to indicate that the fraudulent use reduction system was then operative. It is possible to set the critical amount of data to zero, that is to say that the fraudulent use reduction system could be activated immediately even though it was not yet reliable. Doing so would cause an authorized user to be forced to enter his password for some calls falling within his normal calling patterns until sufficient calling pattern data had been gathered automatically.

In a third embodiment, the initial usage data is gathered both by prompting the authorized user to enter data as described with regard to the first embodiment and by automatically logging data during use of the mobile telephone as described with regard to the second embodiment. This hybrid embodiment might allow greater initial accuracy, the automatic logging compensating for a degree of inaccuracy in the user's subjective impression of his pattern of usage and the data entered by the authorized user compensating for any abnormalities in the authorized user's initial use of the mobile telephone. The hybrid embodiment might also allow a smaller body of data to be gathered by each method, permitting activation of the fraudulent use prevention system early with a minimum of effort from the authorized user.

In general, the longer the period of initial information gathering, or training, lasts, the less likely it will be for the mobile telephone to be deactivated while being used by the actual authorized user. On the other hand, throughout the training period the mobile telephone will not be protected from fraudulent usage thereof. Thus, the length of the training period represents a trade-off between the objectives of minimizing fraudulent use of the mobile telephone and not inconveniencing users by requiring them to enter passwords to continue to be able to place telephone calls from the mobile telephone. The decision of how long the training period should last is therefore left to the carrier. In the preferred embodiments, the carrier sets the length of the training period through software. In addition, the carrier may reset the memory of the telephone through software upon transfer of the mobile telephone to another person or upon the occurrence of a lifestyle change of the user, such as relocation to another state at the time of a job change, resulting in a shifting calling pattern characterized by a preponderance of telephone calls to new clients and friends.

At this stage, the authorized user is also optionally prompted to speak several words, including his name, into the microphone of the mobile telephone. These words are later used in step 218 in connection with voice recognition attempts to unlock the mobile telephone in the event that the user is unable to enter correctly his password into the mobile telephone.

After the completion of the training period, data will continue to be processed in step 200 relating to the use of the mobile telephone by the authorized user thereof. Data previously gathered in step 202 will be added to the body of data regarding the authorized user in step 200 when that data is no longer current. In different embodiments of the present invention, data that is no longer current may be data relating to (i) all usage within a fixed time period x from a point in the past to the current time, (ii) the last x minutes of calls, or (iii) the last x calls.

In step 202, data is gathered about the current user of the mobile telephone. In the preferred embodiments of the present invention, such gathering is performed by automatic logging of such data and storage thereof in non-volatile memory within the mobile telephone.

The data that is gathered in the preferred embodiments include (i) each telephone number to which a call is placed from the mobile telephone or from which a call is received by the mobile telephone, and (ii) each region in which the mobile telephone is present. With regard to the former body of data, the number of calls to or from each such telephone number is stored for easy retrieval, while with regard to the latter body of data, two lists are stored, to wit a list of how many times each entered region was entered and a list of all of the different pairs of entered and exited regions where the entered region is the region in which the mobile telephone is currently located and the exited region is the previous region in which the mobile telephone was located immediately prior to entrance to the current region. All such data will later be transferred in a subsequent iteration of step 200 when it is no longer current to the body of data stored regarding the authorized user.

In other embodiments of the present invention, other data may be gathered as well. For example, the length of each telephone call may be recorded. Many users, particularly those not using their mobile telephones primarily for business purposes, may rarely have calls of long duration, particularly long distance and international calls. Thus, a substantial increase in average duration of calls, particularly long distance and international calls, may indicate that the mobile telephone is being used fraudulently by a non-authorized user. In addition, the time of day of each call might be recorded as many business users place and receive the vast majority of their calls during or near business hours, while many non-business users place relatively few calls during such periods. In still other embodiments, other data relating to a user's calling patterns might be gathered and stored.

In step 204, the telephone number call patterns of the current user and the authorized user are compared. This analysis can take one or more of several forms. One form is a comparison of the percentage of the calls placed or received by the current user that constitute first time calls with some threshold percentage. A related form is a comparison of the percentage of the calls placed or received by the current user that constitute first time calls with the percentage of first time calls made by the authorized user. Another form is a comparison of the percentage of frequent usage calls (determined based on the authorized user's data) placed by or received by the current user with either a predetermined threshold percentage or the percentage of frequent usage calls placed by or received by the authorized user.

Based on the results of the telephone number call analysis, the mobile telephone may be deactivated. In the preferred embodiments, however, the telephone number call analysis is only one factor in the overall analysis of whether to deactivate the mobile telephone.

In step 206, the geographic regions that the current user has entered are compared with the geographic regions entered by the authorized user. This analysis may focus either on the regions entered by the user or the region pairs where one region is the region the user is leaving and the other region is the region the user is entering. In the preferred embodiments, the analysis centers on the former and may take the form of a comparison of the percentage of unfamiliar geographic regions entered by the current user to either a predetermined threshold percentage or the percentage of unfamiliar geographic regions entered by the authorized user. Alternatively, the analysis may take the form of a comparison of the frequent usage geographic regions entered by the current user with either a predetermined threshold percentage or the percentage of the frequent usage geographic regions entered by the authorized user.

Just as with the telephone number call analysis, the mobile telephone may be deactivated based on the results of the geographic region analysis. In the preferred embodiments, however, the geographic region analysis is only one factor in the overall analysis of whether to deactivate the mobile telephone.

In step 208, the pattern of long distance and international calls is analyzed. The number of consecutive long distance and international calls placed or received by the current user may be compared to a predetermined threshold value. Alternatively, the total number of long distance and international calls placed or received by the current user within a predetermined time period may be compared either to a predetermined threshold number or to the average number of such calls placed or received by the authorized user during an equivalent time period. Another option is to compare the total length of long distance and international calls placed or received by the current user within a predetermined time period to either a threshold value or to the average total length of long distance and international calls placed or received by the authorized user during an equivalent time period.

As an additional security option, some mobile telephones offer the user the ability to disable international calling. The user is typically able to re-enable international calling by following a procedure that includes entering a security code. In some embodiments of the current invention, any attempt to place an international call while international calling is disabled will result in the mobile telephone becoming deactivated.

Just as with the telephone number call analysis, the mobile telephone may be deactivated based on the results of the long distance and international calling analysis. Alternatively, the long distance and international calling analysis may be only one factor in the overall analysis of whether to deactivate the mobile telephone. In the preferred embodiments, however, a hybrid approach is used. Exclusive or near exclusive use of the mobile telephone, even for a relatively short period of time will result in immediate deactivation, while a less marked increase in long distance and international calling activity will constitute only one factor in the overall analysis.

Steps 204, 206, and 208 have been described as a series of three steps performed in a fixed sequence, and with respect to each step, several alternative analyses have been described. However, not all of the steps need to be performed, multiple alternatives can be used with respect to any or all steps, and the steps may be performed in any sequence or simultaneously. In addition, whether all of the steps are performed may in some embodiments depend on the results of other steps. For example, the long distance analysis could be performed first, with the results determining whether the telephone would be immediately deactivated or whether the remaining steps would be performed (leading to a later determination of whether to deactivate the mobile telephone based on a combination of several analyses).

Moreover, although a relatively small number of specific comparisons have been discussed herein in connection with certain preferred embodiments of the present invention, it will be understood by those skilled in the art that many other comparisons and algorithms could be used in other embodiments of the present invention.

In step 210, the results of steps 204, 206, and 208 are combined with the aid of a predetermined formula to determine whether the threshold for the maximum allowable degree of variation has been exceeded. This formula will be determined by each carrier and each carrier may utilize different formulae with different classes of users. Moreover, this step may be combined with steps 204, 206, and 208.

In step 212, the mobile telephone is deactivated if the threshold for the maximum allowable degree of variation has been exceeded. If not, the system returns to step 200 and awaits further activity. Some of the older data regarding the current user may at this time be reclassified as relating to the authorized user. In the preferred embodiments, the mobile telephone is not deactivated during a telephone call. Rather, step 212 will be suspended until the conclusion of the current telephone call, if any. In other embodiments, however, the telephone could be deactivated during a telephone call, resulting in the other party or parties to the call being placed on hold until the user succeeds in reactivating the mobile telephone. In the preferred embodiment, when the telephone is deactivated the current user loses the ability to place further calls but maintains the ability to receive calls.

If the mobile telephone has been deactivated, the current user may attempt to reactivate it in step 214 by entering a password previously selected by the authorized user. If the current user succeeds in entering the password correctly within a predetermined number of attempts (such as three), the current user is deemed to be the authorized user and the system returns to step 200.

If the current user fails to enter the password correctly within a predetermined number of attempts, the mobile telephone becomes locked in step 216 (i.e., the current user will no longer be able to receive incoming calls on the mobile telephone.) At this point, the mobile telephone cannot be reactivated by entering a password. In the preferred embodiments, the user will then be able to use either of two methods to unlock (and thereby also reactivate) the mobile telephone (and may receive a prompt on a display on the mobile telephone to this effect). The user may attempt to unlock the mobile telephone through a voice recognition procedure in step 218 or through calling an operator of the carrier in step 220 and providing the operator with standard identification data.

In step 218, which may not be available in certain embodiments or on certain older models of mobile telephones, the user must speak certain words into the microphone of the mobile telephone and may receive prompts on the display of the mobile telephone indicating what words should be spoken. These words may include the authorized user's name (in which case the prompt preferably would indicate only that the user's name should be spoken, not what that name was) and other words. If the current user's utterance matched the authorized user's utterance of these words, within acceptable variance limits, the mobile telephone would be unlocked and the system would return to step 200. Because the voice recognition system is not the only method for unlocking the mobile telephone and because use of the voice recognition system does not require the knowledge of the authorized user's password, it is anticipated that the variance limits with regard to the current user's utterance of the required words would be fairly strict. However, in other embodiments, these limits might be less strict, particularly if the option of calling an operator to unlock the telephone might not always be available.

If in step 218 the system fails to recognize the current user's voice as being that of the authorized user, the only option remaining for unlocking the mobile telephone is to call an operator in step 220 as indicated by a display on the mobile telephone in certain embodiments. In step 220, the user calls the carrier's operator from the mobile telephone at an indicated telephone number, deactivation and locking not preventing the current user from calling such operator in the preferred embodiments. The user is then prompted by the operator to provide certain standard identification information, which might include any of a person's name, addresses, e-mail address, telephone numbers, social security number, and mother's maiden name at the option of the carrier. If the current user supplies the correct information to the operator, the mobile telephone is unlocked and the system returns to step 200. This might be accomplished by electronic transmission of a message from the operator's location to the mobile telephone or by the operator supplying the current user with a code to enter into the mobile telephone. If the current user fails to supply the requisite information correctly, the system continues to step 222 where the mobile telephone remains locked indefinitely. At this point, it is assumed that the current user is a fraudulent user.

Figure 3:
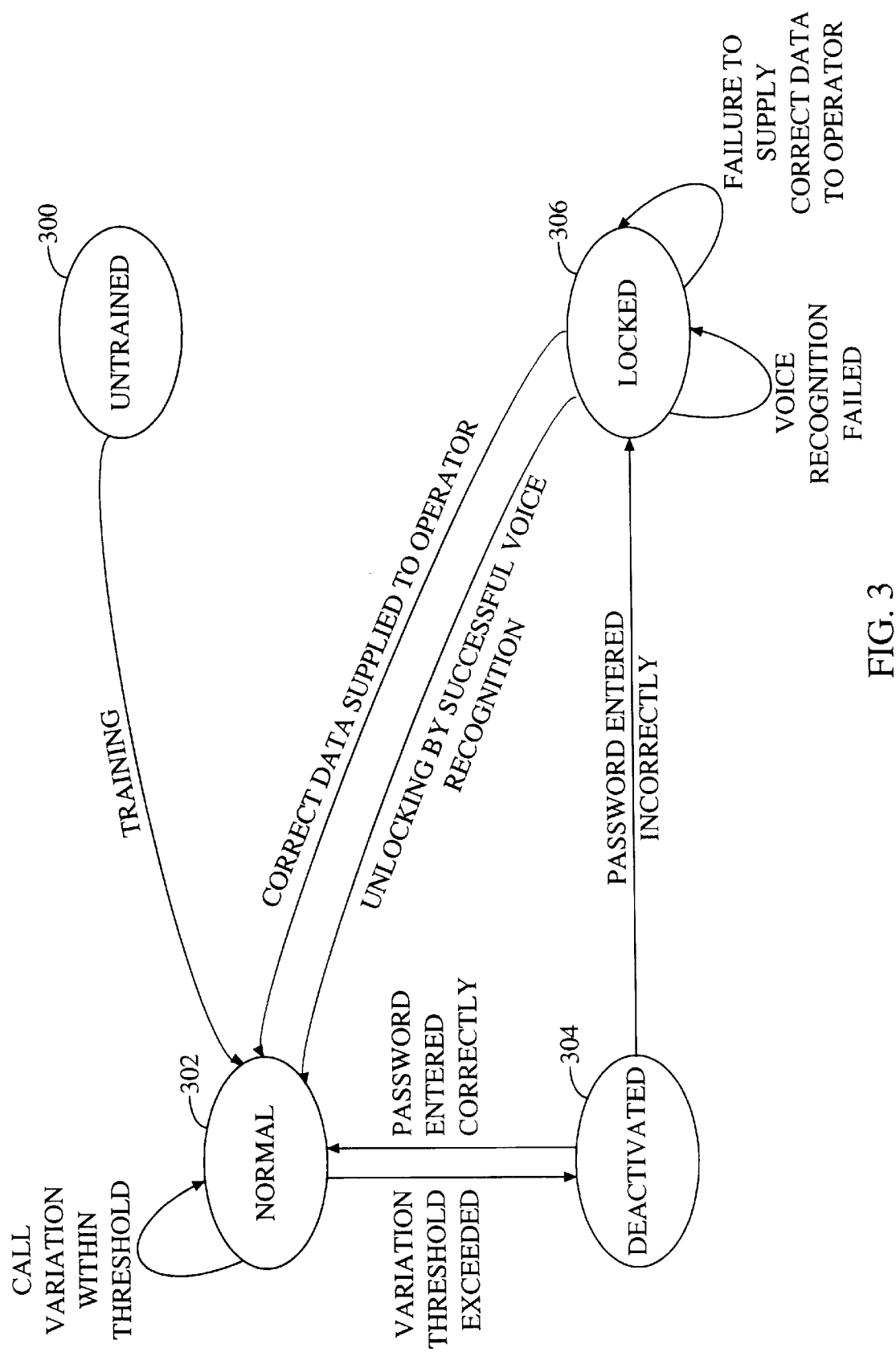
FIG. 3 is a state diagram showing the operation of a preferred embodiment of the present invention.

Turning now to FIG. 3, the mobile telephone may be in any of four primary states. In state 300, the mobile telephone is untrained and the fraud minimization system is inoperative. State 300 relates to the initial iteration of step 200. After training, as described above, the mobile telephone enters state 302, from which it can only be returned to state 300 if the carrier takes unusual measures, such as erasing the memory of the mobile telephone.

State 302 represents the normal state of the mobile telephone in which calls can be placed to and received from any number (unless options such as disabling international calling are activated). The mobile telephone remains in state 302 until and unless normal variation limits are exceeded and the mobile telephone is deactivated in step 212. At this point the mobile telephone enters state 304.

State 304 represents the deactivated state of the mobile telephone. In this state, no calls other than calls to the carrier's operator or to emergency services numbers such as 911 are permitted. From this state, the user can return to state 302 by entering a password correctly, as discussed above in connection with step 214. Failure to enter the password correctly places the mobile telephone in state 306.

State 306 represents the locked state of the mobile telephone. As in the deactivated state, no calls other than calls to the carrier's operator or to emergency services numbers such as 911 are permitted. Successful use of the voice recognition procedure in step 218 or successful provision of required information to the carrier's operator in step 220 will cause the mobile telephone to return to state 302. Otherwise, the mobile telephone will remain in state 306 indefinitely. In certain embodiments of the present invention, state 306 may be composed of sub-states depending on whether the user has or has not unsuccessfully attempted to use various unlocking procedures.

The previous description of the preferred embodiments is provided to enable any person skilled in the art to make or use the present invention. Although the present invention has been described in conjunction with a mobile radio telephone receiver, the principles of the present invention may be applied in other contexts and applications. In addition, various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method of minimizing fraudulent usage of a mobile telephone, comprising the steps of:
   accumulating data regarding an authorized user's prior usage of the mobile telephone through a controller in the mobile telephone;
   accumulating data regarding a current user's usage of the mobile telephone through the controller;
   analyzing the statistical variation in usage between the authorized user's prior usage and the current user's usage through the controller; and
   deactivating the mobile telephone if the variation in usage exceeds a predetermined threshold,
   wherein said step of analyzing the statistical variation in usage includes comparing the identity of other parties to calls initiated or received by the current user with the identity of other parties to calls initiated or received by the authorized user and the comparison of the identity of other parties to calls includes a comparison of the proportion of first time calls previously initiated or received by the authorized user with the proportion of first time calls initiated or received by the current user.

2. The method of claim 1, wherein said step of accumulating data regarding an authorized user's prior usage of a mobile telephone includes entry of such data by the authorized user.

3. The method of claim 1, wherein said step of accumulating data regarding a current user's usage of a mobile telephone includes automatically logging such data during usage of the mobile telephone by the current user.

4. The method of claim 1, wherein said step of accumulating data regarding an authorized user's prior usage of a mobile telephone includes automatic logging of such data during the prior authorized usage of the mobile telephone.

5. The method of claim 1, wherein the comparison of the identity of other parties to calls includes a comparison of the proportion of frequent usage calls previously initiated or received by the authorized user with the proportion of frequent usage calls initiated or received by the current user.

6. The method of claim 1, wherein said step of analyzing the statistical variation in usage includes comparing the identity of the geographic regions that the authorized user previously entered with the identity of the geographic regions that the current user has entered.

7. The method of claim 6, wherein the comparison of the identity of geographic regions includes a comparison of the proportion of unfamiliar geographic regions entered by the authorized user with the proportion of unfamiliar geographic regions entered by the current user.

8. The method of claim 6, wherein the comparison of the identity of geographic regions includes a comparison of the proportion of frequent usage geographic regions previously entered by the authorized user with the proportion of frequent usage geographic regions entered by the current user.

9. The method of claim 1, wherein said step of analyzing the statistical variation in usage includes comparing the proportion of international calls previously initiated or received by the authorized user with the proportion of international calls initiated or received by the current user.

10. The method of claim 1, wherein said step of analyzing the statistical variation in usage includes comparing the proportion of long distance calls previously initiated or received by the authorized user with the proportion of long distance calls initiated or received by the current user.

11. The method of claim 1, further comprising the step of:
    deactivating the mobile telephone regardless of the degree of variation between the usage of the authorized user and the usage of the current user if more than a predetermined number of international calls and long distance calls are placed by the current user within a predetermined period of time.

12. The method of claim 1, further comprising the step of:
    deactivating the mobile telephone regardless of the degree of variation between the usage of the authorized user and the usage of the current user if the combined length of long distance and international calls placed by the current user within a predetermined period of time exceeds a second predetermined amount of time.

13. A method in accordance with any of claims 1 through 12, further comprising the step of:

reactivating the mobile telephone if the user correctly enters a password within a predetermined number of attempts to do so.

14. The method of claim 13, further comprising the step of:

locking the mobile telephone if the user enters an incorrect password a predetermined number of times in an attempt to reactivate the mobile telephone.

15. The method of claim 14, further comprising the step of:

unlocking and reactivating the telephone if an analysis of the voice of the current user substantially matches that of the authorized user.

16. The method of claim 14, further comprising the step of:

unlocking and reactivating the telephone if a comparison of standard identification data provided by the current user over the mobile telephone to an operator matches stored data previously provided by the authorized user.

17. A system for minimizing fraudulent usage of a mobile telephone, comprising:

means for accumulating data regarding an authorized user's prior usage of a mobile telephone;

means for accumulating data regarding a current user's usage of the mobile telephone;

means for analyzing the statistical variation in usage between the authorized user's prior usage and the current user's usage; and means for deactivating the mobile telephone if the variation in usage exceeds a predetermined threshold, wherein said means for analyzing the statistical variation in usage includes means for comparing the identity of other parties to calls initiated or received by the current user with the identity of other parties to calls initiated or received by the authorized user and the means for comparison of the identity of other parties to calls includes a means for comparison of the proportion of first time calls previously initiated or received by the authorized user with the proportion of first time calls initiated or received by the current user.

18. A system for minimizing fraudulent usage of a mobile telephone, comprising:

a controller; and a memory connected to the controller, wherein said controller accumulates data regarding an authorized user's prior usage and a current user's usage of a mobile telephone and stores such data in said memory;

wherein said controller analyzes the statistical variation in usage between the authorized user's prior usage and the current user's usage;

wherein said controller deactivates the mobile telephone if the variation in usage exceeds a predetermined threshold; and wherein said controller compares the identity of other parties to calls initiated or received by the current user with the identity of other parties to calls initiated or received by the authorized user and compares the proportion of first time calls previously initiated or received by the authorized user with the proportion of first time calls initiated or received by the current user.

* * * * *